United States Patent Office 3,061,591
Patented Oct. 30, 1962

3,061,591
TRIS-P-VINYL BENZYL ISOCYANURATE AND
POLYMERS THEREOF
Roy W. Roth, Norwalk, Conn., assignor to American
Cyanamid Company, New York, N.Y., a corporation
of Maine
No Drawing. Filed Nov. 27, 1959, Ser. No. 855,551
16 Claims. (Cl. 260—75)

This invention relates to novel isocyanurate derivatives. This invention more particularly relates to polymerizable tris(ar-vinyl aryl methyl)isocyanurates, including various tris(ar-vinyl benzyl) and tris(ar-vinyl naphthylmethyl)-isocyanurates. The present invention further relates to the addition polymerization products derived from said monomeric isocyanurates and in narrower aspects concerns polymerizable polyester resinous compositions comprising a mixture of an ethylenically unsaturated polyester and a tris(ar-vinyl aryl methyl)isocyanurate and to the cured products obtained from said compositions.

In the field of resin chemistry, the symmetrical triazine configuration has long been utilized successfully in the preparation of resinous products and especially in the preparation of thermoset products evidencing singular properties. Perhaps the most outstanding characteristic associated with products derived from triazine compounds is the high degree of thermostability which these products exhibit. The formals of an amino triazine and especially the formals of melamine or the lower soluble polymers thereof, the latter classes of materials being usually referred to as melamine resins, represent not only the forerunner but the present important commercial exploitation of resinifiable materials based on the triazine configuration. In the preparation of synthetic polymers, two fundamental types of polymerization mechanisms are encountered, namely, condensation and addition polymerization. The melamine resins mentioned represent typically those polymer forming precursors which cure (thermoset) by means of a condensation type reaction. On the other hand there are important and distinctly different classes of thermosetting compositions which depend on the addition type polymerization reaction in order to effect proper cure thereof. As an example of the latter, mention is made of the hereinabove referred-to polyester resinous compositions.

It is the primary object of my invention to provide a novel class of addition polymerization monomeric materials containing the triazine configuration. Accordingly, in the practice of my invention, one can now advantageously utilize a novel class of addition polymerizable monomeric triazine compounds to prepare thermoset products exhibiting such desirable qualities as had hitherto only been practically limited to condensation polymeric products and more specifically products derived from the melamine resins.

I am aware that there have been efforts made heretofore directed to the utilization of ethylenically unsaturated triazine derivatives in preparing thermoset products. However, to the best of my knowledge the prior art attempts in this direction have been concerned solely with polymerizable unsaturated triazine derivatives wherein the polymerizable unsaturation is of the allyl type. Typical examples of the prior art compounds are exemplified by such as, triallyl cyanurate, triallyl isocyanurate and the allyloxy methyl amino triazines. These type compounds are of course polymerizable and they are based on the triazine configuration; however, they all suffer in that the unsaturation contained thereby is of the allyl type and consequently they are relatively difficult to polymerize or copolymerize. Generally in order to effect efficient polymerization of these allyl derivatives one must employ relatively high polymerization temperatures and when so doing extreme exothermic conditions are experienced which causes various deleterious effects.

Basically constituting the instant invention is my discovery of a new class of polymerizable compounds and more specifically isocyanurate derivatives containing vinyl unsaturation. These compounds may be represented by the following formula:

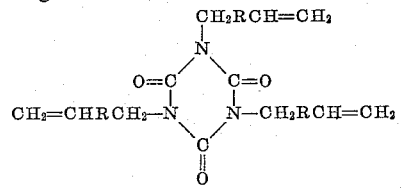

wherein R represents a substituted or unsubstituted benzene or naphthalene ring.

The novel polymerizable compounds of this invention may be prepared by a known one-step cyclization process comprising effecting reaction under heat between an alkali metal cyanate, more particularly a cyanate of sodium, potassium, lithium, rubidium or caesium and various halomethylstyrenes or halomethyl-vinyl naphthalenes. In the particular reaction scheme involved, the halomethyl substituent of either the styrene or naphthalene intermediate is the functional group. It is desirable that the halogen of said group be either chlorine, bromine or iodine, with chlorine representing the preferred halogen.

In brief, the process involved in preparing the compounds of this invention consists of heat-reacting an alkali metal cyanate such as set forth hereinabove with a vinyl aryl halomethane of the type described in the required presence of a suitable inert reaction medium. This one-step process is known and is exemplified in the Kaiser et al. Patent No. 2,536,849.

Suitable vinyl aryl halomethanes that may be utilized in this process encompass a plurality of halo methyl styrenes and naphthalene halomethanes. Examples of applicable halo methyl styrenes are such as 1-vinyl-3-chloromethyl benzene, 1-vinyl-4-chloromethyl benzene, 1-vinyl-2-methyl-4-chloromethyl benzene, 1-vinyl-2-bromo-4-chloromethyl benzene, 1-vinyl-2-ethyl-4-chloromethyl benzene, and 1-vinyl-3-fluoro-4-chloromethyl benzene, 1-vinyl-2-propyl-4-chloromethyl benzene, etc. The corresponding bromomethyl and iodomethyl benzenes may likewise be suitably employed. From this specific enumeration of applicable halo methyl styrenes it is to be properly inferred that it is preferred to employ alkyl nuclear substituted halo methyl styrenes wherein the alkyl group contains not more than about 4 carbon atoms. Particularly when it is contemplated that the cyclization product will be employed as polymerizable monomers, it is desirable to limit the said substituents to radicals which are not likely to hinder in a steric manner the vinyl grouping and thus adversely affect the polymerization potential of the ultimate polymerizable isocyanate product. Obviously, if the intended use of the isocyanurates be such where the polymerizable potential of same is not of particular concern, the referred-to substitutents need not be so limited. Also since it is believed that the cyclization reaction involved in preparing the compounds is largely a function of the reactivity of the halogen contained by the methyl substituent it is highly desirable that the starting material contain no interfering substituents ortho to said halo methyl group.

Other aryl halides that may be used to prepare the isocyanurate derivatives of this invention include a class of chloromethyl-vinyl naphthalenes. Illustrative of this class of starting materials include: 2-chloromethyl-8-vinyl naphthalene, 2-chloromethyl-5-vinyl naphthalene, 1-chloromethyl-5-vinyl naphthalene, 1-chloromethyl-4-vinyl naphthalene, and 2-chloromethyl-4-vinyl naphthalene. Like in the consideration of the applicable halo methyl styrenes, one may employ either of the bromomethyl or iodomethyl substituted compounds corresponding to the naphthalenes specifically enumerated. Additionally, the naphthalene type intermediates may contain other nuclear substituents such as lower alkyl groups, that is, wherein the carbon atoms are four or less and halo groups, especially if these substituents do not exist in a position ortho to the halo methyl substituent.

The reaction between the ar-vinylarylhalomethane and the alkali metal cyanate should be carried out at elevated temperatures and preferably within the range of from about 40 to 150° C. Atmospheric pressure may be used although super-atmospheric pressure reaction conditions may be observed if desired.

In a reaction of the type herein concerned it is necessary to employ an inert reaction medium in which the alkali metal cyanate is at least partially soluble. In order to effect efficient cyclization of the reactants it is necessary that the reactants be in a homogeneous phase. Since the cyanates that may be employed are solid materials, having comparatively high melting points it is not possible to employ reaction temperatures capable of liquifying the system and thereby effecting a homogeneous reaction phase in this manner. The inert reaction media that may be used need not completely dissolve the alkali metal cyanate but the solubility of the cyanate therein should be of a sufficient magnitude so that the reaction will proceed efficiently. In such a substantially heterogeneous reaction system, as the cyclization product is produced more and more of the cyanate will dissolve in the medium so that the reaction is finally effected to the complete utilization of the reactable cyanate existing in the reaction mixture. Examples of suitable solubilizing or reaction media are such as dimethyl formamide, acetonitrile, propionitrile, beta-methoxypropionitrile, dimethylcyanamide and nitrobenzene.

In carrying out the cyclization reaction the molar ratio of alkali metal cyanate and the ar-vinylarylhalomethane can be varied over a fairly wide range representing more or less than the stoichiometric proportions indicated for these reactants. It is preferred that the reactants be used in equal molar proportions, that is, in a stoichiometric relationship. However, excesses of either of the reactants to the extent of about 50 mol percent above the stoichiometric amount can be used. The solubilizing agent, such as for example dimethyl formamide, can additionally be varied over rather wide limits ranging for example from about ½ to 10 and even higher times the total volume of alkali metal cyanate and the ar-vinylarylhalomethane. The reaction mixture is preferably agitated during the reaction period which may range from about ½ hour to 24 hours depending on a host of factors such as temperature, pressure, type of inert solvent medium, ratio of reactants etc. The recovery of the reaction product and purification thereof are procedures conventional in nature.

The tris(vinyl aryl)isocyanurates of this invention may be homopolymerized or copolymerized with other vinyl unsaturated monomeric materials to prepare a variety of thermoset products. When used in this manner to prepare a thermoset product it is necessary to prepare the product by casting techniques since the novel polymerizable compounds of this invention are not adapted for high pressure molding methods.

Thermoset copolymeric compositions may be prepared using the tris(vinyl aryl methyl)isocyanurates of this invention by copolymerizing said isocyanurates with a large number of different monomeric vinyl materials. It is not necessary to employ appreciable amounts of the isocyanurate in combination with other vinyl monomers in order to obtain thermoset properties. Usually an amount of compounds of this invention in the order of about 10% or less in combination with the conventional monovinyl compounds will result in cured products of the thermoset type. Nevertheless, it is contemplated that in some instances it may be desirable to employ said combinations wherein the isocyanurate component constitutes the major proportion thereof.

Representative of monovinyl monomeric compounds that may be copolymerized with the isocyanurates of this invention to produce thermoset product include compounds having the following general formula:

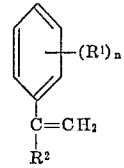

wherein $R^1$ is a lower alkyl radical of from 1 to 4 carbon atoms, halogens such as chlorine, bromine, iodine and fluorine, $n$ is an integer of from 0 to 2 and $R^2$ is a member selected from the group consisting of hydrogen and lower alkyl radicals. Examples of such compounds which may be used are styrene per se, nuclear-substituted alkyl styrenes, e.g., o-, m-, and p-methyl styrenes, 2,3- and 2,5-dimethyl styrene, p-ethyl styrene, m-propyl styrenes, m-propyl styrene and the like; nuclear-substituted halo-alkyl styrenes, e.g., p-chloromethyl styrene, m-dibromoethyl styrene and the like; nuclear-substituted halo styrenes, e.g., o-, m- and p-chlorostyrenes, o-, m- and p-bromostyrenes, 2,3-, 3,5- and 2,4-dichlorostyrene, 2-iodo, 3-methyl styrene and the like; alpha-substituted styrenes, e.g., alpha-methyl styrene, alpha-ethyl styrene, alpha-chlorostyrene, alpha-bromo styrene, alpha-iodoethyl styrene, etc.

Besides the above stated styrene compounds other monomers may be suitably employed such as acrylonitrile; the various substituted acrylonitriles (e.g., methacrylonitrile, ethacrylonitrile, phenylacrylonitrile, etc.); the various acrylamides and substituted acrylamides (e.g., methacrylamide, ethacrylamide); the various N-substituted acrylamides and N-substituted alkacrylamides, for instance N-methylol acrylamide, N-monoalkyl and -dialkyl acrylamides and methacrylamides, e.g., N-monomethyl, -ethyl, -propyl, -butyl, etc., and N-dimethyl, -ethyl, -propyl, -butyl, etc., acrylamides and methacrylamides; N-monoaryl and -diaryl acrylamides and alkacrylamides, e.g., N-monophenyl and -diphenyl acrylamides and methacrylamides, etc.; vinyl esters, e.g., vinyl acetate, vinyl propionate, vinyl butyrate, vinyl isobutyrate, vinyl valerate, vinyl acrylate, vinyl methacrylate, etc.; esters of an acrylic acid (including acrylic acids, e.g., methacrylic acid, ethacrylic acid, phenylacrylic acid, etc.), more particularly the alkyl esters of an acrylic acid, e.g., the ethyl, propyl, isopropyl, n-butyl, sec.-butyl, tert.-butyl, amyl, hexyl, heptyl, octyl, decyl, dodecyl, etc., esters of acrylic methacrylic, ethacrylic, phenylacrylic, etc., acids including the alkyl acrylates.

The tris(ar-vinyl aryl methyl)isocyanurates contemplated herein may be beneficially utilized in conjunction with other vinyl monomers to prepare thermoplastic products. However, when these isocyanurates are used in this manner the polymerizable mixture must consist essentially of a monomer or monomers of the monovinyl type. Particularly exemplary of monovinyl compounds that may be used to prepare the improved thermoplastic products in accordance with this invention are represented by the styrenes specifically enumerated directly hereinabove. Additionally, any one of the other vinyl monomers mentioned may be used by themselves or in combination with one another or for that matter in combination with a styrene. The use of the isocyanurates of this invention in small quantities in combination with monovinyl monomers such as styrene will impart to the ultimate polymerization product improved properties in the nature of superior heat distortion, solvent resistance, impact strength and the like. When the compounds of my invention are utilized in this fashion it is necessary that rather small quantities thereof be employed in relation to the monovinyl constituent. Generally, amounts of the tris(ar-vinyl aryl methyl)isocyanurates in the order of about 1% or less will impart the improved properties to the thermoplastic polymer as regards superior heat distortion, impact resistance, etc.

As had been indicated previously a very important utility for the novel isocyanurates of this invention resides in their use as a cross-linking monomeric agent in thermosetting polyester resinous compositions. The polyester resinous compositions contemplated are well known in the art and comprise broadly a mixture of an essentially linear reactive or unsaturated polyester and an ethylenically unsaturated monomeric cross-linking agent containing a polymerizable $CH_2=CH<$ group capable of copolymerizing with the reactive resin.

The reactive resin or unsaturated polyester component of these compositions may be conveniently prepared by esterifying an alpha, beta-ethylenically unsaturated dicarboxylic acid with a polyhydric alcohol, usually a saturated aliphatic glycol. Among the alpha, beta-ethylenically unsaturated dicarboxylic acids that may be used to supply polymerizable unsaturated sites along the linear polyester chain are such as maleic, fumaric, aconitic, itaconic, monochloromaleic anhydride and the like. Non-polymerizable dicarboxylic acids may also be employed if used in combination with an ethylenically unsaturated dicarboxylic acid. If a non-polymerizable acid is used, the amount thereof should not constitute more than 80% of the total equivalents of carboxylic groups present in the esterifying mixture. Examples of non-polymerizable polycarboxylic acids which may be used in the manner described include: oxalic, malonic, succinic, adipic, suberic, azalaic, sebacic, tricarballylic, malic, either ortho phthalic or isophthalic acid, the various chlorinated phthalic acids, hexachloroendemethylene tetra hydro phthalic and the like. Either the acid form of the polycarboxylic esterifiable component or the anhydride form thereof where available may be interchangeably used.

Among the polyols that may be employed to prepare the reactive resin the glycols are preferred. Examples of suitable diols are such as ethylene glycol, diethylene glycol, propylene glycol, dipropylene glycol, triethylene glycol, the various butane diols, pentane diols, hexane diols, neopentyl glycol and the like. However, polyols having more than two hydroxyl groups may also be used; for example, glycerol, trimethylol ethane, trimethylol propane, pentaerythritol, dipentaerythritol, sorbitol, mannitol, xylitol, etc. In the formation of the esterification mixtures wherein the higher functional polyols are used it is usually desirable that a dihydric alcohol be employed in major proportions relative to any alcohols containing more than two hydroxyl groups.

With regard to the specific formulation of the reactable components comprising the esterification mixture, it is usually desirable that the polyhydric alcohol component, usually a dihydric alcohol, be employed in an amount which represents at least a stoichiometrical relationship between the hydroxy groups and carboxylic groups present. Generally it is preferred that an excess of polyhydric alcohol be employed representing approximately 10 or 15% excess of hydroxyl groups over and above the equivalents of carboxylic acid groups present. When a polyhydric alcohol containing more than two hydroxyl groups and/or a polycarboxylic acid having more than two carboxylic groups are used, it is desirable to increase the excess of hydroxyl groups existing in the esterification mixture to about 15% to 20% above the stoichiometrical requirement in order that there will be substantial esterification of the acids present prior to the occurrence of any appreciable amount of cross-linking in the esterification reaction mixture.

The polyhydric alcohol component and the polycarboxylic acid component existing in the esterification mixture should be reacted sufficiently to produce a polyester having an acid number preferably not greater than 60. A suitable acid number range for resins of this type is from about 30 or less, to about 50.

The temperature at which the esterification reaction is carried out is not critical and a suitable range is from about 160 to 225° C. Preferably the reaction temperature is one just below the boiling point of the most volatile component of the reaction mixture which is generally the glycol employed.

Further details pertaining to the preparation of these unsaturated polyester resins are disclosed in Ellis Patent No. 2,255,313 and Kropa Patent Nos. 2,433,735 to 2,443,741, inclusive.

In the polyester resinous compositions of the type herein concerned, a monomeric cross-linking component is an essential ingredient. Under the conditions which these compositions are cured (thermoset) the monomeric material existing in the composition reacts, that is, copolymerizes with the essentially linear polyester component thus linking the total composition into a complex, three dimensional type of structural configuration having substantially insoluble and infusible properties. The isocyanurates of this invention are particularly suitable in preparing heat-resistant, cured products. This is so because of the triazine structure associated with the monomers of this invention. In the field of polyester resins the term heat-resistant means that the cured product will not seriously degrade in physical properties upon prolonged heating of the product at elevated temperature. Polyester resinous compositions, more properly, thermoset products derived therefrom are required to have a high degree of heat-resistance when employed in numerous applications such for example in the preparation of component parts for aircraft assemblies.

The isocyanurates of this invention may be used solely as the monomeric cross-linking component in the polyester resinous composition, especially in the preparation of heat-resistant laminates therefrom. The isocyanurates embodied herein are relatively high melting compounds and accordingly when used solely as the monomeric cross-linking agent in polyester resinous compositions designed for laminating purposes it may be necessary to employ a solvent in which the isocyanurates and polyester are mutually soluble. The solutions of the polyester resinous compositions containing the isocyanurates of this invention may then be used employing standard techniques to impregnate the particular type of reinforcer employed in fabricating the laminate. After the reinforcing member or members have been suitably impregnated the volatile solvent employed to effect homogeneity in the polyester resinous composition may be evaporated off. The laminate assembly so processed may be then cured following conventional practices. Suitable solvents for the purpose just stated include a variety of aromatic hydrocarbons such as, for example, xylol, toluol, benzene, etc.

Oftentimes it may be desirable not to employ as the sole monomeric cross-linking agent the tris(ar-vinyl aryl methyl)isocyanurates of this invention. When it is so desired the conventional cross-linking agents may be used in combination with the isocyanurates. This procedure simplifies fabricating techniques, as for instance are encountered in the preparation of laminates, because the isocyanurates are readily soluble in conventional cross-linking agents. A polyester resinous composition may be prepared from such a combination of monomeric materials without resorting to the use of an inert solvent to effect homogeneity. Examples of other monovinyl cross-linking agents that may be used in conjunction with the isocyanurates may be any one of those specifically enumerated hereinabove in connection with the discussion of applicable copolymers that may be prepared in accordance with this invention. In this regard it is advisable to refrain from the use of allyl unsaturated monomeric material in conjunction with the isocyanurates embodied herein because the vast difference in polymerization rates exhibited by these two distinct classes of materials is such so as to result in the polyester resinous composition curing improperly.

The ratio of unsaturated polyester resin to the monomeric cross-linking agent, the latter including the isocyanurates herein disclosed, solely or in combination with the other distinct types of cross-linkers as described may be varied over a wide range. The unsaturated resin content may, therefore, range from about 10 to 90 parts to a corresponding 90 to 10 parts of polymerizable monomer. For the majority of the purposes, however, the active polymerizable components comprise from about 40 to about 60 parts by weight of the unsaturated polyester and correspondingly from about 60 to 40 parts of the polymerizable monomeric material. The ratio of isocyanurates to the other monovinyl monomers that may be used ranges likewise over wide limits. Thus the isocyanurates may comprise the total amount of cross-linking agent or they may exist in an amount as low as 10% or even less of the polymerizable monomeric component of the polyester resinous composition.

In the preparation of laminates the curing of the reactive resin-monomeric cross-linking agent may be accomplished with or without pressure. However, curing under a nominal degree of pressure such as in the order of 10–15 p.s.i. is customarily observed. Suitable temperatures for curing range from about 30° C. to about 200° C. or even higher. The laminates may be formed into flat sheets or they may be shaped (molded) into particular designs that may be desired.

In curing laminates and additionally in effecting the polymerization of an isocyanurate of this invention to prepare homopolymers or copolymers thereof, it is preferred that a polymerization catalyst be used although the use thereof is imperative. Suitable polymerization catalysts include the various super oxides such as the acidic peroxides and alcoholic hydroperoxides. Among the preferred catalysts there are: the acidic peroxides, e.g., benzoyl peroxide, phthalyl oxide, octyl peroxide, succinyl and benzyl acetyl peroxide, alcoholic peroxides, alcohol hydroperoxides, e.g., tertiary butyl hydroperoxide, cumene hydroperoxide and terpene oxide, e.g., ascaridole. Still other polymerization catalysts that might be used in some instances are aluminum chloride, stannic chloride, boron trifluoride and azo type catalysts such as azodiisobutyronitrile. When a catalyst is employed the concentration thereof is usually small, i.e., for the preferred catalysts, from about 1 part catalyst per 1000 parts of the polymerizable mixture to about 2 parts per 100 parts of said mixture.

In order that those skilled in the art may better understand how the present invention may be practiced, the following examples are given. These examples are set forth primarily for the purpose of illustration and any enumeration of details contained therein should not be interpreted as a limitation on the case except as indicated in the appended claims. All parts are parts by weight unless otherwise indicated.

*Example I*

Tris(ar-p-vinyl benzyl)isocyanurate was prepared in the following manner. Into a suitable reaction vessel equipped with a thermometer, mechanical stirrer and an inert gas inlet tube were charged 162 parts (2 mol equivalents) of potassium cyanate and 3600 parts of dimethylformamide. With stirring and under an atmosphere of nitrogen the slurry of potassium cyanate was heated slowly to 90° C. A solution of 303 parts (2 mol equivalents) of chloromethylstyrene dissolved in 450 parts of dimethylforamide was slowly and uniformly added to the slurry. The addition of the chloromethylstyrene solution was accomplished in a period of approximately 30 minutes. After the chloromethylstyrene solution had been completely added the reaction mixture was held with stirring at 90° C. for an additional 1½ hours. The reaction mixture was cooled to room temperature and the potassium chloride formed during the reaction was removed by filtration. The filtrate was then evaporated at reduced pressure and the solid residue obtained was recrystallized from ethanol. The yield of product amounted to 167 parts corresponding to a 52% recovery of theoretical. The melting point of the tris(ar-p-vinyl benzyl) isocyanurate was 174° C. with polymerization.

*Analysis.*—Calculated: C, 75.45; H, 5.70; N, 8.80. Found: C, 75.42; H, 5.56; N, 8.73.

*Example II*

Ten parts of tris(ar-p-vinyl benzyl)isocyanurate was dissolved in 5 parts of toluene at 25° C. To the solution of isocyanurate was added 0.2% benzoyl peroxide based on the monomer. Thereupon, the bulk of the toluene solvent was removed by placing the catalyzed monomer in a vacuum oven maintained at 30° C. The catalyzed monomer was then charged to a suitable mold and the mold placed in an oven at 175° C. and retained therein for 2–3 minutes after reaching the temperature specified. Upon removal from the oven and cooling the casting was discharged from the mold and was found to be optically clear and hard and to exhibit a bright surface appearance. The molding was observed to be substantially insoluble and infusible and to evidence a high degree of physical strength properties. The casting also was determined to be non-flammable in nature.

*Example III*

A styrene-acrylonitrile-tris(ar-p-vinyl benzyl)isocyanurate tripolymer in the weight ratio of 70:29:1, respectively, was prepared in the following manner. The requisite quantities of monomers were charged to a prebodying pot and benzoyl peroxide as the polymerization catalyst was added thereto in the amount of 1% based on the weight of monomers charged. The polymerization mixture was heated to 90° C. and with stirring was held at this temperature for 9 hours after which time the polymerization mixture contained about 60% polymer and 40% residual monomer. The partially polymerized reaction mixture was thereupon discharged from the prebodying pot into a devolatilization extruder of the type described in U.S. Patent No. 2,745,824. The temperature of the charge introduced into the extruder instantly rose to 170° C. and was maintained at this temperature during this phase of the polymerization cycle. The devolatilization pressure within the extruder was maintained at 20 mm. Hg and the residence time in the extruder was 2 minutes. The polymerized product from the extruder contained 98% polymeric material. The extruded material was fabricated by means of a differential roll into a sheet having a ⅛″ thickness. The fabricated sheet so produced was compared with a similar sheet prepared from a similarly processed copolymer of styrene and acrylonitrile of 70:30 parts, respectively. The solvent resistance, impact strength and heat distortion properties of the tripolymer prepared in accordance with this invention was significantly superior to that observed for the comparable copolymer.

*Example IV*

A thermosetting copolymer of tris(ar-p-vinyl benzyl) isocyanurate was prepared in the following manner. A mixture was made consisting of 40 parts of tris(ar-p-vinyl benzyl)isocyanurate and 60 parts of a mixture of isomeric methylstyrenes. The isomeric mixture consisted of o-, m- and p-methylstyrenes containing 33%, 2% and 65% of said isomers, respectively. The polymerizable mixture was catalyzed with tertiary butyl hydroperoxide in the amount of 0.5% based on the weight of the polymerizable mixture. A portion of this composition was charged to a 38 mm. x 300 mm. glass drawn-neck test tube. The test tube was purged with purified nitrogen so as to remove air and was immediately sealed with an oxygen torch. The tube was then placed in an oil bath at 100° C. for 4 hours followed by 24 hours at 150° C. After cooling the glass was removed from the hard, clear white polymer. The cast polymer was then sized into a specimen ¼" thick of approximately 1" width. The specimen was polished, to yield an optically clear sample. The sample was determined to be substantially insoluble and infusible and to exhibit excellent mechanical strength properties. The sample was then further heated for an extended period at an elevated temperature following which the mechanical strength properties such as flexural strengths at various temperatures were again determined. Extended aging at the elevated temperature did not significantly affect in an adverse manner the mechanical strength properties of the specimen.

*Example V*

Into a suitable reaction vessel equipped with a stirrer, thermometer and an air cooling reflux condenser were charged 96 parts of maleic anhydride, 296 parts of phthalic anhydride and 250 parts of propylene glycol. With carbon dioxide passing beneath the surface of the reaction mixture so as to provide an inert atmosphere thereover, the mixture was gradually heated to a temperature of 160° C. Heating was continued at this temperature for approximately 3 hours whereupon the temperature was gradually raised to 195° C. The esterifying mixture was held at the indicated temperature until an acid number of 40 was reached and thereupon cooled to 70° C. On the basis of 70 parts of the polyester resin thus prepared were added 30 parts of toluene. After a solution of the polyester resin was obtained same was cooled to room temperature and on the basis of 100 parts of the resin solution were added 30 parts of tris(ar-p-vinyl benzyl)isocyanurate and homogeneity of these ingredients effected by stirring. The resultant syrup was catalyzed with a combination of benzoyl peroxide and cumene hydroperoxide each in the amount of 0.5% based on the combined weight of isocyanurate and polyester resin.

A 2-ply laminate employing as the reinforcer 181-136 type glass fiber cloth conforming to specification MIL-F-9084 was prepared in the following manner. The two pieces of glass fiber cloth were laid side to side on a sheet of cellophane. Onto each piece of the glass cloth was poured the catalyzed syrup of this sample in such an amount so as to provide a cloth to solid resin weight ratio of approximately 65:35, respectively. The resin was then suitably spread out over the entire surface of each piece of the cloth. The resin syrup was allowed to soak in the fabric for 15 minutes so that the glass fabric was thoroughly impregnated. After the soaking period, the sheet of cellophane containing the two impregnated cloths were deposited into a vacuum oven maintained at 35° C. The impregnated cloths were maintained under said conditions until the volatile component (toluene) had been substantially completely evaporated. After removal from the oven, the cellophane sheet was folded over in such a manner that the impregnated cloths were disposed one on the other. The so-produced laminate assembly was then cured between caul plates in a hydraulic press equipped with steam-heated platens. The pressure applied during curing was approximately 15 p.s.i. In effecting curing, the temperature of the assembly was raised from room temperature to a temperature ranging between about 180 to 200° C. in 15 minutes. The laminate was further cured for 2 hours at 180° C., following which curing cycle the laminate was cooled to room temperature.

The laminate exhibited extreme hardness and showed excellent heat resistant qualities.

I claim:
1. A tris(ar-vinyl aryl)isocyanurate.
2. A tris(ar-vinyl benzyl)isocyanurate.
3. A tris(ar-vinyl naphthylmethyl)isocyanurate.
4. Tris(ar-p-vinyl benzyl)isocyanurate.
5. The addition polymerization product of a tris(ar-vinyl aryl)isocyanurate.
6. The addition polymerization product of a tris(ar-vinyl benzyl)isocyanurate.
7. The addition polymerization product of tris(ar-p-vinyl benzyl)isocyanurate.
8. The addition copolymerization product of a tris(ar-vinyl aryl)isocyanurate and a monovinyl compound copolymerizable with said isocyanurate.
9. The addition copolymerization product of a tris(ar-vinyl benzyl)isocyanurate and a monovinyl compound copolymerizable with said isocyanurate.
10. The addition copolymerization product of tris(ar-p-vinyl benzyl)isocyanurate and a monovinyl compound copolymerizable with said isocyanurate.
11. A thermosetting resinous composition of matter comprising an unsaturated polyester of an alpha, beta-ethylenically unsaturated dicarboxylic acid and a dihydric alcohol and as a cross-linking agent for said polyester a tris(ar-vinyl aryl)isocyanurate.
12. A thermosetting resinous composition of matter comprising an unsaturated polyester of an alpha, beta-ethylenically unsaturated dicarboxylic acid and a dihydric alcohol and as a cross-linking agent for said polyester a tris(ar-vinyl benzyl)isocyanurate.
13. A thermosetting resinous composition of matter comprising an unsaturated polyester of an alpha, beta-ethylenically unsaturated dicarboxylic acid and a dihydric alcohol and as a cross-linking agent for said polyester tris(ar-p-vinyl benzyl)isocyanurate.
14. A substantially insoluble and infusible product of polymerization of a resinous composition of matter comprising an unsaturated polyester of an alpha, beta-ethylenically unsaturated dicarboxylic acid and a dihydric alcohol and as a cross-linking agent for said polyester a tris(ar-vinyl aryl)isocyanurate.
15. A substantially insoluble and infusible product of polymerization of a resinous composition of matter comprising an unsaturated polyester of an alpha, beta-ethylenically unsaturated dicarboxylic acid and a dihydric alcohol and as a cross-linking agent for said polyester a tris(ar-vinyl benzyl)isocyanurate.
16. A substantially insoluble and infusible product of polymerization of a resinous composition of matter comprising an unsaturated polyester of an alpha, beta-ethylenically unsaturated dicarboxylic acid and a dihydric alcohol and as a cross-linking agent for said polyester tris(ar-p-vinyl benzyl)isocyanurate.

References Cited in the file of this patent
UNITED STATES PATENTS

| | | |
|---|---|---|
| 2,516,836 | Drechsel et al. | Aug. 1, 1950 |
| 2,536,849 | Kaiser et al. | Jan. 2, 1951 |
| 2,606,892 | Kropa et al. | Aug. 12, 1952 |
| 2,848,440 | Davis et al. | Aug. 19, 1958 |
| 2,947,736 | Lundberg | Aug. 12, 1960 |
| 2,952,668 | Ehlers et al. | Sept. 13, 1960 |